United States Patent [19]
Kimmel et al.

[11] 4,068,377
[45] Jan. 17, 1978

[54] ROTARY CUTTING ASSEMBLY

[76] Inventors: Richard L. Kimmel, 1402 Lawrence Lane; Walter B. Kamp, 206 Bellevue Blvd. South, both of Bellevue, Nebr. 68005; Alvin L. P. Aasgaard, III, 3623 Armbrust, Omaha, Nebr. 68124

[21] Appl. No.: 712,507

[22] Filed: Aug. 9, 1976

[51] Int. Cl.² .................. B26B 27/00; A01D 55/18
[52] U.S. Cl. .................................. 30/276; 30/500; 56/12.7
[58] Field of Search ............ 30/276, 347, 500; 56/12.7, 295

[56] References Cited
U.S. PATENT DOCUMENTS

| 3,555,680 | 1/1971 | Ford | 30/276 |
| 3,826,068 | 7/1974 | Ballas | 56/12.7 |
| 3,859,776 | 1/1975 | Ballas | 56/12.7 |

FOREIGN PATENT DOCUMENTS 6,938,265  10/1969  Germany .................. 56/12.7

Primary Examiner—Jimmy C. Peters
Attorney, Agent, or Firm—George R. Nimmer

[57] ABSTRACT

Disclosed herein are rotary cutting assemblies for cutting growing vegetation with tough whirling filament. The assemblies generally comprise an elongate lineal shaft extending along a vertical-axis, the longitudinal shaft having a top-end for removable insertion into a portable manually-graspable powered chuck; a horizontal disc-like base-plate in co-rotatable association with the shaft lower portion; a convolutely coiled supply of filament surrounding the shaft vertical-axis; axial confinement means for confining the stored filament toward the base-plate; retainer means attached to the base-plate for removably securing successive leadward portions of the wearable cutting filament adjacent the base-plate peripheral-edge; and gravimetric balancing means for the rapidly rotating lower head portion of the assembly comprising base-plate and environs.

13 Claims, 7 Drawing Figures

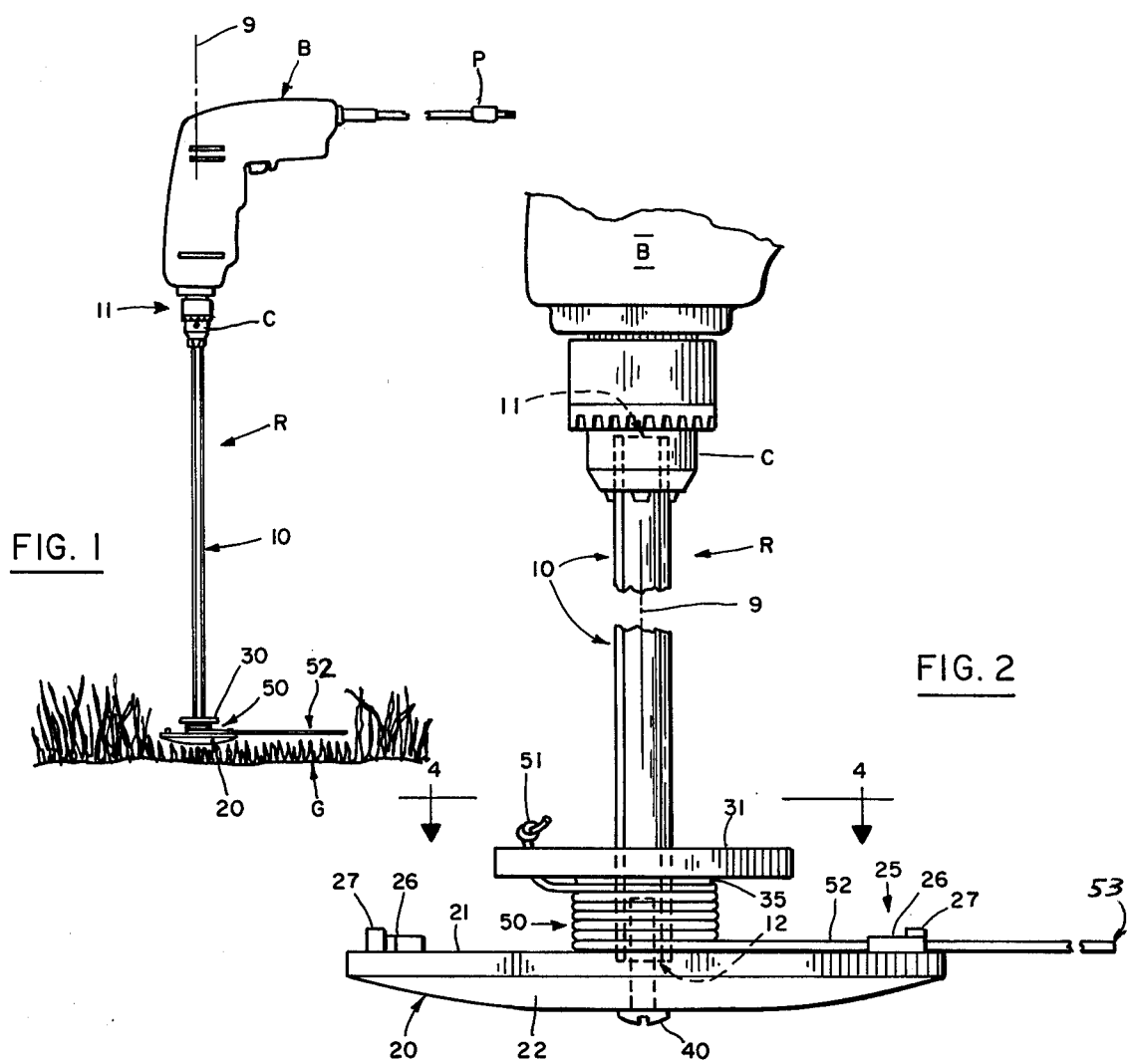
FIG. 1
FIG. 2
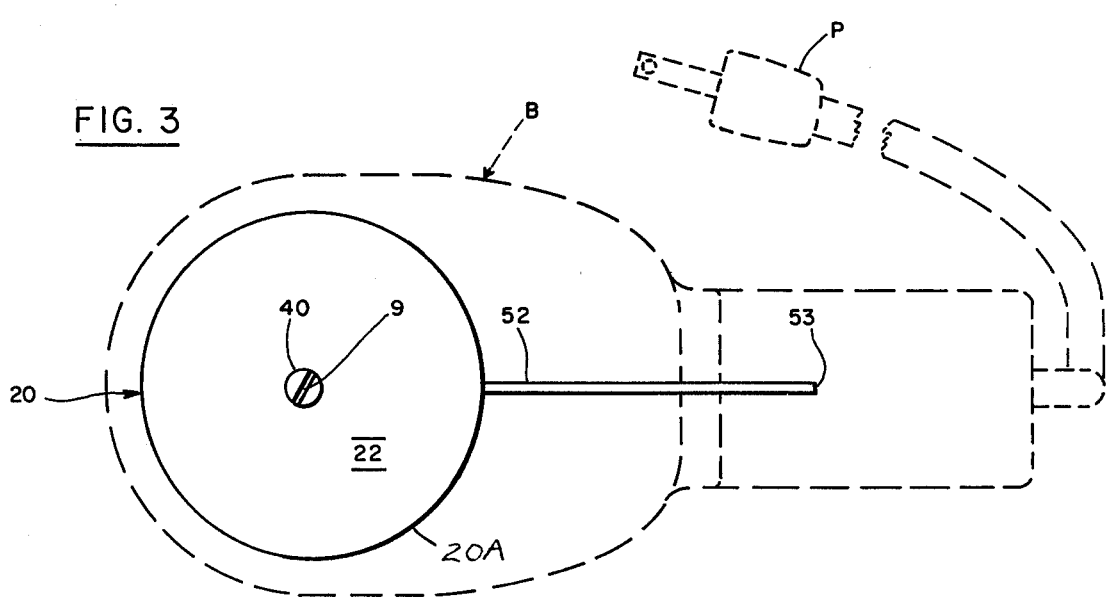
FIG. 3

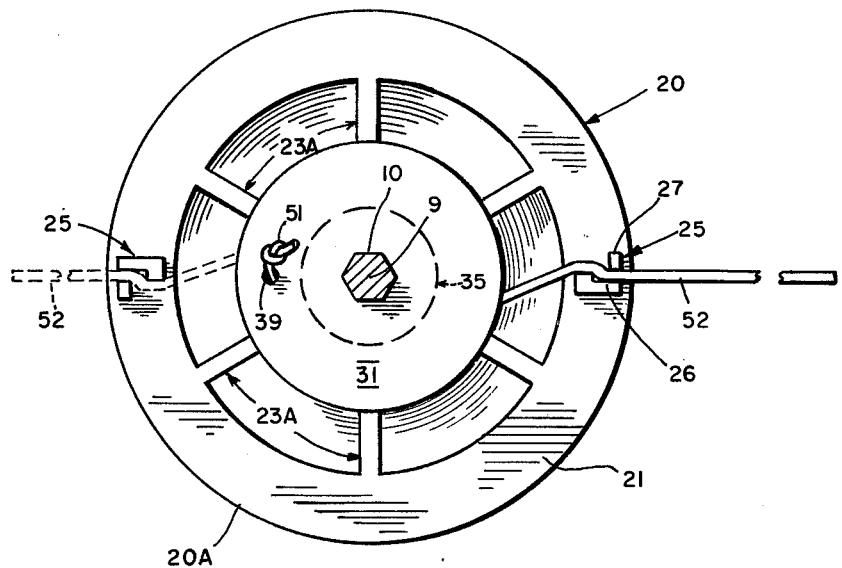
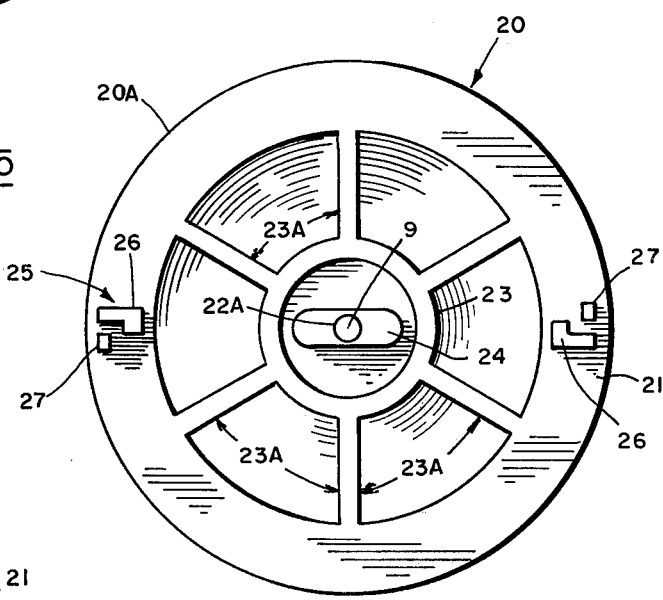
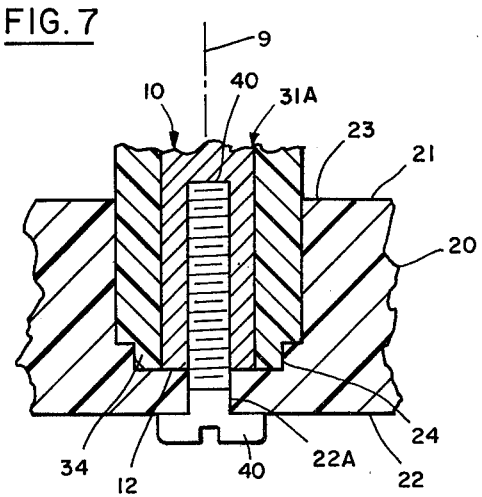
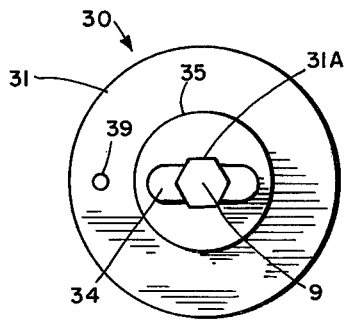

ROTARY CUTTING ASSEMBLY

Rotary cutting assemblies for cutting growing vegetation with whirling filament, and especially intended for household lawn trimming, are generally alluded to in the prior art including, inter alia U.S. Pat. Nos. 3,708,967 and 3,826,068. However, these and other related prior art vegetation cutting devices suffer from several noteworthy disadvantages and deficiencies. Many of the prior art devices are too cumbersome to permit convenient, comfortable and trouble-free use by the typical householder. Others are mechanically unreliable and difficult, if not impossible, to repair. Most are too expensive for the average householder to purchase by virtue of requiring a integrally incorporated special power plant, such as an electric motor designed exclusively for the rotary cutting assembly.

It is accordingly the general objective of the present invention to provide an improved and economical rotary cutting assembly of the whirling filament type and which overcomes many of the disadvantages and deficiencies of prior art structures. An important ancillary objective is to provide a rotary cutting assembly which does not require an elaborate specially-designed powering means, but rather can be simply powered as by a conventional portable powered drill chuck which is already possessed by the householder for other purposes, e.g. a household drill, etc.

With the above and other objects and advantages in view, which will become apparent as this description proceeds, the vegetation rotary cutting assembly herein generally comprises: an elongate lineal shaft extending along a longitudinal vertical-axis, the shaft having a bottom-end and also a top-end for removable insertion into a portable-held powered chuck for rapidly rotating the shaft around its vertical-axis; a disc-like base-plate co-rotatably associated with the shaft nearer its bottom-end and having a peripheral-edge remotely surrounding the shaft and lying within a horizontal plane; a convolutely coiled supply of cutting filament located adjacent the base-plate and surrounding the shaft vertical-axis; at least one retainer means attached to the base-plate for removably securing successive leadward portions of the wearable filament radially outwardly from the vertical-axis and base-plate peripheral edge and in cutting relationship to growing vegetation; axial confinement means for maintaining the coiled stored filament longitudinally confined toward the base-plate; and gravimetric balancing means to ensure that the center-of-mass for the assembly head portion (e.g. combination of base-plate, confinement means, filament, and retainer means) is located substantially at the vertical-axis.

In the drawing, wherein like characters refer to like parts in the several views, and in which:

FIG. 1 is a elevational view of a representative embodiment of the rotary cutting assembly of the present invention;

FIG. 2 is a detail elevational view of FIG. 1;

FIG. 3 is a bottom plan view thereof;

FIG. 4 is a sectional plan view taken along line 4-4 of FIG. 2;

FIG. 5 is a top plan view of a preferred embodiment base-plate component;

FIG. 6 is a bottom plan view of a preferred embodiment for the axial confinement means component; and FIG. 7 is a detail elevational view in section showing the FIGS. 5 and 6 components in assembled relationship at the assembly head end.

As is indicated in the FIGS. 1 and 2 elevational views, the rotary cutting assembly "R" generally comprises an elongate lineal shaft 10 extending along a vertical-axis 9. The longitudinally extending shaft 10 has a top-end 11 for removable insertion into a portable operator-held powered chuck "C", such as typified by a powered conventional hand-drill "B", whereby the shaft 10 is rapidly powerably rotatable about its vertical-axis 9. Co-rotatably associated with shaft 10 near its bottom-end 12 is a disc-like base-plate 20 which has adjacent thereto a convolutely coiled supply of tough flexible filament 50. Successive leadward portions 52-53 of filament 50 are extendable radially outwardly of axis 9 and base-plate 20 to cut growing vegetation at the earth's surface "G" as shaft 10 and base-plate 20 together rotate upwards of 1800 rpm about vertical-axis 9. Preferably, the length of shaft 10 is within the range of some 12 to 18 inches so that the standing operator (holding powering means "B") may be able to accomplish the vegetation cutting task in comfortable non-stooping posture. However, because of the lengthy distance from powering plant "B" to the rapidly whirling cutting head (e.g. 20,30,50), apparatus "R" requires gravimetric balancing means to ensure that the cutting head center-of-mass is located substantially at axis 9. In this vein, base-plate 20 and axial confinement means 30 are each geometrically symmetrical about axis 9. As the vegetation cutting proceeds over extended time periods, leadward portions of the wearing filament need to be periodically fed radially outwardly from supply 50 which is coiled about axis 9, each successive filament leadward portion 52-53 being removably secured to base-plate 20 with suitable retainer means e.g. 25. Thus, the typical householder might utilize an electrically ("P") powered handdrill "B" having chuck "C" for powering assembly "R" which cuts growing vegetation at "G" with expendably wearable tough whirling filament 52-53.

Elongate lineal shaft 10 extending longitudinally lengthily along vertical-axis 9 is preferably of non-circular cross-sectional shape, including near top-end 11 and bottom-end 12 to promote secure co-rotatable engagement with rotating chuck "C" and with the downwardly remote cutting head (e.g. 20,30). Uniform polygonal shapes and sizes are preferred for the shaft cross-section, such as the hexagonal shape seen in FIG. 4.

Disc-like base-plate 20 is co-rotatably associated with shaft 10 nearer bottom-end 12 and substantially perpendicular to axis 9. Base-plate 20 includes a peripheral-edge 20A lying within a horizontal plane, periphery 20A being herein of circular geometric shape with axis 9 at the geometric center. The base-plate includes a pair of surfaces extending transversely of axis 9, including a lower-surface 22 (herein of frusto-spheroidal shape) and an uppersurface 21 (herein defining a horizontal plane perpendicular to axis 9).

Attached to the base-plate and extending upwardly from that surface nearer the coiled filament supply 50 is suitable retainer means (e.g. 25) for removably securing a filament leadward portion 52 to the base plate, the retainer means being located nearer the base-plate peripheral-edge 20A than to vertical-axis 9. Desireably, there is a plurality of retainer means and (consistent with gravimetric balancing means) spaced at substantially equal intervals about and like distances radially from vertical-axis 9, whereby alternate positions for the filament leadward portions 52–53 are possible as indicated in FIG. 4 phantom line.

The preferred type base-plate component 20, depicted alone in FIG. 5, comprises a central circular hub 23 surrounding axis 9 with a plurality of radial horizontal ribs 23A (spaced at equal angles about axis 9) extending outwardly from hub 23 toward annular periphery 20A. Ribs 23A and hub 23 are located above frustrospheroidal lower-surface 22 and together are herein co-planar at base-plate upper-surface 21. Base-plate 20 is centrally perforate (22A) along axis 9, hole 22A being surrounded by hub 23. The horizontal base of hub 23 above lower-surface 22 is provided with a horizontally transversely slotted portion 24 which registers with hole 22A. Preferably, the base-plate and the retainer means (25) are together singularly constructed of a hard resinous structural material. For example, each retainer means herein desireably comprises an L-shaped boss 26 and lug 27 each upstanding from plane 21, the horizontal distance between boss 26 and lug 27 being sufficiently close to permit a tight frictional manually-pressed fit therebetween for successive filament radial leadward portions 52.

There are axial confinement means (30–31) for maintaining the stored filament (which is coiled about axis 9) longitudinally confined toward the rotating base-plate 20, and herein at its upper-surface 21. Moreover, the axial confinement means is co-rotatable with the shaft (10) and the base-plate (20). Herein, the preferred confinement means comprises a singly-flanged (31) spool 30 having its upright collar 35 surrounding axis 9. The periphery of horizontal flange 31 surrounds axis 9 and collar 35, but not base-plate edge 20A. Consistent with gravimetric balancing, the periphery of flange 31 is herein geometrically symmetric about axis 9 such as circular with axis 9 at the geometric center. The coiled stored portion of filment 50 surrounds circular collar 35 whereby transverse flange 31 provides axial confinement means of coil 50 toward base-plate 20. The filament knotted trail portion 51 passes downwardly through flange aperture 39. Spool 30 is herein provided with an axial bore 31A of non-circular cross-sectional shape, such as hexagonal to match shaft 10, to provide a co-rotatable relationship therewith.

In order to provide the necessary co-rotatable relationship between the flange and base-plate, it would be possible inter alia to integrally fabricate spool 30 with base-plate 20. However, as indicated in FIG. 7, for embodiment "R" shaft 10 does itself extend downwardly into base-plate 20. Rather, the lower-end of spool collar 35 is provided with a horizontally extending upright shoulder 34 which extends mateably downwardly into base-plate slot 24. A threaded fastener, such as screw 40, passes upwardly through baseplate hole 22A, and thence along axis 9 into removable threaded engagement with the shaft bottom-end 12 thereby removably and securely holding spool shoulder 34 within base-plate slot 24. Accordingly, when so removably assembled for cutting vegetation at 53, base-plate 20 and spool 30 are rendered co-rotatable with shaft 10. After the entire filament coil 50 has become expended after having radially withdrawn therefrom numerous successive leads 52–53 for cutting vegetation, a fresh coiled filament supply is installed between the confinement flange 31 and base-plate 20 simply by temporarily removing screw 40.

From the foregoing, the construction and operation of the rotary cutting assembly will be readily understood and further explanation is believed to be unnecessary. However, since numerous modifications and changes will readily occur to those skilled in the art, it is not desired to limit the invention to the exact construction shown, and accordingly, all suitable modifications and equivalents may be resorted to, falling within the scope of the appended claims.

We claim:

1. Rotary cutting assembly for cutting vegetation with whirling filament and comprising:
    A. An elongate lineal shaft extending along a vertical-axis, the longitudinally extending shaft having a bottom-end and also a top-end for removable insertion into a portable manually-held chuck whereby the shaft is powerably rotatable about its vertical-axis;
    B. A disc-like base-plate co-rotatably associated with the shaft and located at the shaft bottom-end, said base-plate including a peripheral-edge lying within a horizontal plane and with the shaft at the substantial geometric center of said base-plate, the base-plate including a pair of transversely extending surfaces including a lower-surface and an upper-surface;
    C. A convolute supply of filament surrounding the shaft vertical-axis and located immediately adjacent a transverse surface of the base-plate, successive leadward portions of said filament supply being horizontally drawable radially outwardly from the vertical-axis and outwardly beyond the base-plate peripheral-edge for cutting vegetation as the shaft rotates;
    D. At least one retainer means attached to the base-plate for removably securing a leadward filament portion to the base-plate, the said at least one retainer being located nearer the base-plate peripheral-edge than to the longitudinal vertical-axis;
    E. Axial confinement means for maintaining the stored convolute filament longitudinally confined with respect to the base-plate; and
    F. Gravimetric balancing means to ensure that the center-of-mass for the combination of base-plate, retainer means, and axial confinement means is located substantially at the shaft vertical-axis.

2. The rotary cutting assembly of claim 1 wherein the base-plate peripheral-edge is of circular shape and concentric about the shaft vertical-axis; wherein the convolute filament supply is located above the base-plate at its transverse upper-surface; and wherein the axial-confinement means comprises a flanged symmetrical spool including a collar portion surrounding the shaft and which collar positions the spool transverse flange a finite-gap above the base-plate for storing the convolutely coiled filament therebetween, said spool flange being cross-sectionally smaller than the base-plate peripheral-edge.

3. The rotary cutting assembly of claim 13 wherein the shaft is of non-circular cross-sectional shape to provide a co-rotatable association with the base-plate; wherein the base-plate and the retainer means are together singularly constructed of a hard resinous material; and wherein the flanged and collar portions of the spool axial confinement means each concentrically surrounds the shaft vertical-axis.

4. The rotary cutting assembly of claim 2 wherein the lower portion of the longitudinal shaft is of non-circular cross-sectional shape to provide a co-rotatable association with the base-plate, said non-circular shaft being removably connected to the base-plate.

5. The rotary cutting assembly of claim 4 wherein the base-plate above its lower-surface includes a horizontally transversely slotted portion; wherein the confinement means spool at its lower-end is provided with a transversely extending shoulder extending downwardly into the base-plate transversely slotted part to provide a co-rotatable relationship between the spool and base-plate; wherein the non-circular shaft lower portion is securely surrounded by a geometrically similar bore of the spool whereby the shaft and spool are maintained in co-rotatable relationship; and wherein a vertical fastener extends upwardly along the vertical-axis from the base-plate lower-surface and is removably threadedly engaged with the shaft bottom-end to securely seat the spool shoulder within the base-plate slotted part whereby the spool and base-plate are removably non-rotatably associated.

6. The rotary cutting assembly of claim 1 wherein the base-plate lower-surface is of frustro-spheroidal shape, the base-plate being centrally perforate to accommodate the vertical threaded fastener; wherein the base-plate above its lower-surface is provided with a plurality of ribs extending radially outwardly from the vertical-axis; wherein there is a plurality of retainer means spaced at equal angular intervals about the vertical-axis, the base-plate and retainer means being together singularly constructed of a hard resinous material; and wherein the spool and base-plate are respectively geometrically similar about the vertical-axis to provide gravimetric balancing means for the assembly cutting head.

7. The rotary cutting assembly of claim 6 wherein each retainer means comprises an L-shaped boss and a lug each upstanding from the base-plate upper-surface with the lug being slightly loftier than is the boss, the distance between the lug and boss being such as to provide a tight frictional fit therebetween for the filament leadward portion; and wherein the shaft is of hexagonal cross-sectional shape with the entire shaft having a length of at least 15 inches from its top-end to its bottom-end.

8. The rotary cutting assembly of claim 7 in combination with a portable operator-graspable powered drill chuck, the shaft top-end being removably secured by the chuck and located below the powering means.

9. The rotary cutting assembly of claim 1 in combination with a portable operator-graspable powered drill chuck, the shaft having a symmetrical cross-sectional shape and a length of at least twelve inches from its top-end to its bottom-end, the shaft top-end being removably secured by the chuck and located below the powering means.

10. The rotary cutting assembly of claim 9 wherein there is a plurality of retainer means spaced at equal intervals about the vertical-axis; and wherein the spool and base-plate are respectively geometrically similar about the vertical-axis to provide gravimetric balancing means for the assembly cutting head.

11. Rotary cutting assembly for cutting vegetation with whirling cutting filament and comprising:
   A. An elongate lineal shaft extending along a vertical axis, the longitudinally extending shaft having a bottom-end and also a powered top-end whereby the shaft is powerably rotatable about its vertical-axis;
   B. A disc-like base-plate co-rotatably associated with a lower portion of said shaft, said base-plate including a circular peripheral-edge lying within a horizontal plane and concentrically surround said shaft, the base-plate including a pair of transversely extending surfaces including a lower-surface and an upper-surface;
   C. At least one retainer means attached to the base-plate for removably securing a leadward portion of convolutely stored cutting filament to the base-plate, the base-plate and the retainer means being together singularly constructed of a hard resinous material;
   D. Said convolutely stored cutting filament surrounding the shaft and located immediately adjacent a transverse surface of the base-plate, successive leadward portions of said filament supply being horizontally drawable radially outwardly the shaft to the retainer means and thence outwardly beyond the base-plate peripheral-edge for cutting vegetables as the shaft powerbly rotates; and
   E. Axial confinement means for maintaining the stored convolute cutting filament longitudinally confined toward the base-plate.

12. The rotary cutting assembly of claim 11 wherein the convolute filament supply is located above the base-plate at its transverse upper-surface; wherein the shaft is of non-circular cross-sectional shape to provide a co-rotatable association with the base-plate; and wherein the axial confinement means comprises a symmetrical flanged spool concentrically surrounding the shaft and including a collar portion which positions the spool transverse flange a finite-gap above the base-plate for storing the convolutely coiled cutting filament therebetween.

13. The rotary cutting assembly of claim 13 wherein the base-plate lower-surface is of frustro-spherical shape; and wherein there is a plurality of retainer means spaced at equal angular intervals about the vertical-axis.

* * * * *